Sept. 4, 1934. L. W. EGGLESTON ET AL Re. 19,300

ELECTRIC SWITCH

Original Filed Nov. 18, 1930

Inventors
Lewis W. Eggleston and
Earnest J. Dillman
By their Attorney
C. G. Heylmun Reissued Sept. 4, 1934

Re. 19,300

UNITED STATES PATENT OFFICE 19,300

ELECTRIC SWITCH

Lewis W. Eggleston and Earnest J. Dillman, Detroit, Mich., assignors to Detroit Lubricator Company, Detroit, Mich., a corporation of Michigan Original No. 1,953,469, dated April 3, 1934, Serial No. 496,413, November 18, 1930. Application for reissue July 11, 1934, Serial No. 734,638

32 Claims. (Cl. 200—140)

Our invention relates to new and useful improvements in electric switches, and more particularly to a switch which is automatically operated.

An object of our invention is to provide a switch having means to prevent injury to the parts upon overtravel of the operating means.

Another object is to provide a switch in which contact is made and broken with a quick action to avoid arcing of the switch.

Another object is to provide a switch of simple construction and which will operate efficiently.

The invention consists in the improved construction and combination of parts to be more fully described hereinafter, and the novelty of which will be particularly pointed out and distinctly claimed.

In the accompanying drawing, to be taken as a part of this specification, we have fully and clearly illustrated a preferred embodiment of our invention, in which drawing—

Figure 1:
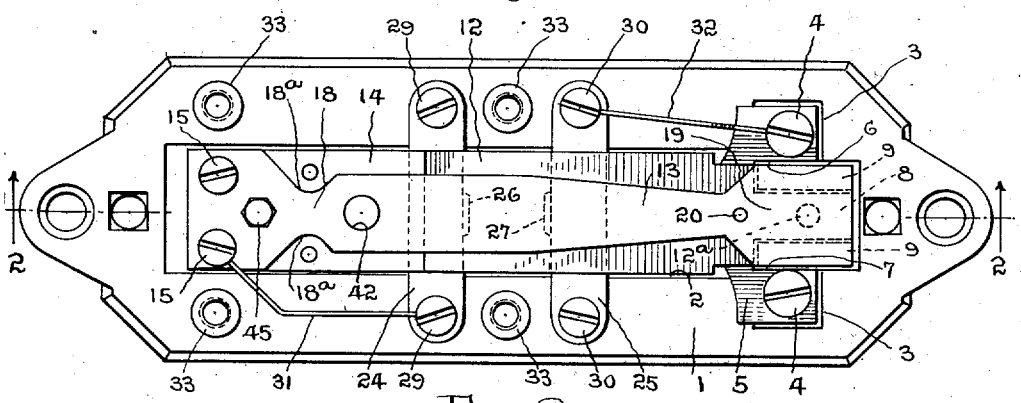
Figure 1 is a plan view of our device having the casing or cover member and certain operating means removed.
Figure 2:
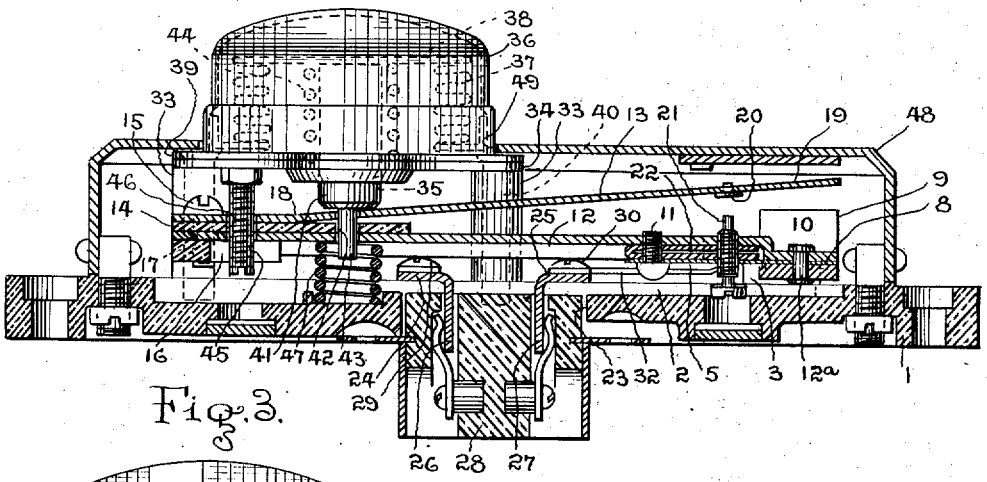
Fig. 2 is a view in section on the line 2—2 of Fig. 1, showing the cover member in section and the operating means in side elevation.
Figure 3:
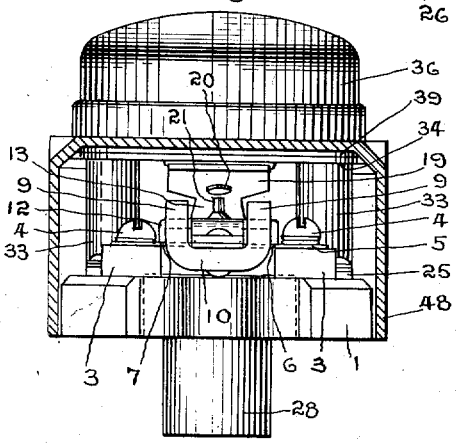
Fig. 3 is an end view looking from right to left of Fig. 2 and with the cover member in vertical section.

Referring to the drawing by characters of reference, 1 designates a base member, preferably of electric insulating material, having a substantially rectangular, elongated recess 2 in its top face, and having adjacent one end and at the sides of the recess, oppositely disposed bosses or supporting blocks 3. Bridging the space between the blocks 3 and secured thereto by screws 4, is a flexible, resilient plate or hinge member 5, preferably of bronze, having between the blocks longitudinal, substantially parallel slots 6, 7, providing therebetween a tongue portion 8. Extending upwardly through the slots 6, 7 are the poles or arms 9 of a substantially U-shaped permanent magnet 10 having its base engaging the under face of portion 8. Overlying the member 5 and clamped thereto by a screw or the like 11, is a rigid bar or supporting member 12, preferably of brass, having one end extending between the magnet po'es 9. The magnet base, tongue portion 8 and end of member 12 are fixed tightly to each other, as by a rivet or the like 12ª so that the magnet 10 is carried rigidly by the member 12. The member 5 serves to secure member 12 to the base member and also acts as a fulcrum on which member 12 is movable to swing or oscillate toward and from the base member. The member 12 extends substantially to the opposite end of the recess 2 and normally lies in a plane substantially parallel to the base member. Supported on and carried by the member 12 at its free end is a resilient and flexible switch blade or member 13 which overlies and is substantially coextensive in length with the member 12, and which is spaced from the top face of member 12 by a sheet 14 of insulating material. The blade 13 is rigidly fixed to member 12 by screws or the like 15, which are threaded into an insulating block 16 on the under side of member 12, the screws 15 passing freely through apertures 17 in member 12 in spaced relation thereto. The blade 13 is bent adjacent its secured end, as at 18, so that it normally inclines slightly upward at an angle to the plane of the member 12 and is spaced therefrom for the major part of its length for movement toward and from the same. The width of the blade 13 is preferably reduced at the bend 18 as by side or edge recesses 18ª to increase the flexibility of the blade. The blade 13, which is preferably of steel or other magnetic material, extends over and in cooperable relation to the magnet poles 9, the end portion 19 thereof serving as an armature. Between the free end of member 12 and magnet 10, the blade 13 has a contact member or point 20 which is in overlying, cooperable relation to a contact member or point 21 carried by the member 12. The end portion 19 is of greater width than the main body of the blade 13, such that the end of the blade is weighted. The blade 13 is also preferably of reduced width adjacent the contact member 20 so as to increase the flexibility of the blade between its fixed end and the contact member 20. The contact member 21 extends upward through alined apertures in members 5 and 12 and is adjustably threaded in a member 22 clamped between members 5 and 12 by the screw 11.

Through the base member 1 and opening upwardly into recess 2 is an aperture 23, across which extend contact strips 24, 25, preferably brass, having contact fingers 26, 27 extending into the aperture 23 for cooperation with the terminals of a plug 28 fitted in the aperture. The strips 24, 25 extend beneath the member 12 and are fixed to the base member by screws 29, 30, respectively. Joining the strip 24 and blade 13 is a conductor 31 which is secured at its ends by the screws 15 and 29. The strip 25 is connected to contact member 21 by a conductor 32 held at its ends by the screws 4 and 30.

On opposite sides of recess 2 at the opposite end thereof from magnet 10 and laterally spaced from the free end portion of member 12, are corner posts or supports 33, on the top ends of which is seated a plate member 34 which overlies and is spaced from the blade 13 and member 12. Through the plate member 34 is a substantially central aperture 35 which is positioned substantially directly over the longitudinal center lines of member 12 and blade 13 adjacent the bend 18 but between the bend and the magnet 10 and at a point in the length of blade 13 where the same is normally spaced from member 12. Supported on the posts 33 and the top face of the plate member 34, is a power means responsive to fluid pressure, such as a temperature responsive operating means or thermostat 36 comprising a hermetically sealed casing or bulb containing a volatile liquid and having its under side or bottom wall which overlies the plate member 34 formed by a resilient, expansibe-contractible member 37, preferably a circumferentially corrugated metal bellows having a head 38. The thermostat casing has a lateral, surrounding flange 39 which seats on the plate member 34. Through the flange 39 and plate member 34 are passed clamping screws 40 which preferably extend downward through posts 33 and are threaded into the base member 1 and which serve to rigidly secure the thermostat and plate member 34 on the posts and to the base member. Secured substantially centrally to and depending from the head 38 and reciprocable with the member 37, is a plunger or operating member 41, preferably of insulating material, which extends through the aperture 35 and abuts or engages the top face of blade 13 toward its free end from the bend 18. Concentric with plunger 41 are alined apertures 42 through blade 13, insulating sheet 14 and member 12, through which extends a reduced end portion 43 on plunger 41, the portion 43 cooperating with apertures 42 to provide guide means for the plunger 41. Opposing downward movement of plunger 41 and head 38 upon expansion of the volatile liquid in the thermostat casing, is a resilient means 44, preferably a coil spring, surrounding the plunger 41 and held under compression between plate member 34 and head 38. Carried by the supporting member 12 adjacent its free end is an adjustment member 45 which serves as a stop member and cooperates with the under side of plate member 34 to limit movement of member 12 toward the plunger 41 and to set the position of member 12 relative to plunger 41 to determine the extent of travel of plunger 41, which acting on blade 13 will cause engagement of the contact members 20, 21. The member 45 is preferably a screw which extends through and is threaded in the block 16 and extends upwardly through an aperture 46 in member 12, blade 13 and insulating sheet 14 in spaced relation to the sides of the aperture. The block 16 is preferably slotted in the longitudinal axis of the screw 45 so that the resilience of the block will hold the screw in adjusted position. The free end of member 12 is mounted on or supported by a resilient means 47, preferably a coil spring having one end seating on the base member 1 in the recess 2, and at its other end engaging the under face of member 12 substantially concentric with plunger 41. The spring 47 cooperates with screw 45 and normally urges the member 12 toward plunger 41 to the limit permitted by screw 45. The spring 47 in addition, serves to permit overtravel of the plunger 41 in operating the blade 13, so that the supporting member 12 can move downward with lost motion about its fulcrum by compression of spring 49 upon continued expansion of the thermostat after operation of the switch.

Cooperating with the base member 1 is a cover member or casing 48 which is clamped thereto and has an aperture 49 through which the thermostat casing projects. The peripheral portion of the aperture 49 preferably overlies the flange 39 and seats thereon.

The operation of the device is as follows: The adjustment member 45 is set to determine the temperature at which the thermostat will cause contact to be made. As the adjustment member 45 is screwed downward, permitting spring 47 to move the supporting member 12 toward the plunger 41, the lower the temperature will be at which the switch will be operated. The contact member 21 is adjusted relative to the plane of the top ends of poles 9 to determine the temperature differential, i. e., the number of degrees of temperature variation which will occur between making and breaking of contact. The contact member 21 limits movement of armature 19 toward magnet 10 and prevents engagement therebetween. As the contact member 21 is screwed upward, the extent to which armature 19 can approach magnet 10 will be decreased, thereby reducing the power of the magnet to hold the contact members in engagement and decreasing the temperature differential. As the thermostat 36 is heated, for example, by the atmosphere surrounding the same, the volatile liquid therein will expand, moving the plunger 41 toward the supporting member 12. The plunger 41 will move the blade 13 toward the member 12, flexing the blade at the bend 18 against its inherent resilience until the armature 19 is moved into the field of the magnet 10. When the magnetic attraction of the magnet becomes greater than the inherent resilience of blade 13, the magnet will slightly bow the blade 13, due to its reduced portion adjacent contact 20 and quickly draw the contact member 20 into engagement with contact member 21. Should the volatile liquid continue to expand after contact is made, the plunger 41 will move blade 13 into engagement with member 12 and then depress the member 12 about its secured end by compressing the spring 47 without affecting the engagement of contact members 20, 21, or injuring the switch mechanism. As the temperature surrounding the thermostat 36 decreases, the volatile liquid will contract and spring 44 will retract the plunger 41. As the plunger 41 moves upward, the magnet 10 aided by the relatively heavy end portion 19 will maintain contact between members 20 and 21, permitting the force inherent in the blade 13 to build up as the blade is released by the plunger 41. When the blade 13 is so far released by plunger 41 that its inherent force will overcome the magnetic attraction, then the blade will spring upward and the contact will be broken with a snap action.

What we claim and desire to secure by Letters Patent of the United States is:

1. A device of the character described, comprising a movable supporting member having a resilient mounting, a switch blade fixed to and overlying said member and movable toward and from the same, and an operating means engageable with said blade to move said blade relative to said member, said resilient mounting permitting overtravel of said means.

2. A device of the character described, comprising a movable supporting member having a resilient mounting, a switch blade fixed to and overlying said member and movable toward and from the same and normally disposed at an angle thereto, and an operating means engageable with said blade to move said blade relative to said member, said resilient mounting permitting overtravel of said means.

3. A device of the character described, comprising a movable supporting member having a resilient mounting, a resilient switch blade fixed to and overlying said member and movable toward and from the same, and an operating means engageable with said blade to move said blade relative to said member, said resilient mounting permitting overtravel of said means.

4. A device of the character described, comprising a movable supporting member having a resilient mounting, a switch blade fixed to and overlying said member and movable toward and from the same, an operating means engageable with said blade to move said blade relative to said member, said resilient mounting permitting overtravel of said means, and means to adjust said blade relative to said means to regulate the operation of said blade by said means.

5. A device of the character described, comprising a movable supporting member secured adjacent one end and resiliently supported adjacent its opposite end and carrying a contact member adjacent said one end, a switch blade movable toward and from said contact member and fixed to said supporting member, and operating means engageable with said blade and operable to move said blade relative to said contact member, said supporting member moving on its resilient support to permit overtravel of said means.

6. A device of the character described, comprising a base member, a supporting member secured to said base member and movable relative thereto, means limiting the movement of said supporting member in one direction, resilient means urging said supporting member to its limit of movement, a resilient member secured to and overlying said supporting member and movable toward said supporting member, and cooperable contact members carried by said resilient member and said supporting member.

7. A device of the character described, comprising a base member, a supporting member movable relative thereto and secured adjacent one end to said base member, said supporting member having a contact member adjacent said end and having a resilient member fixed thereto and overlying said contact member, a contact member carried by said resilient member and cooperable with said first contact member, means operable to move said resilient member relative to said supporting member, and means to adjust the position of said supporting member relative to said last-named means.

8. A device of the character described, comprising a base member, a supporting member movable relative thereto and secured adjacent one end to said base member, said supporting member having a contact member adjacent said end and having a resilient member fixed thereto and overlying said contact member, a contact member carried by said resilient member and cooperable with said first contact member, means operable to move said resilient member relative to said supporting member, resilient means normally urging said supporting member toward said last-named means, and means to limit movement of said supporting member toward said operable means.

9. A device of the character described, comprising a base member having a supporting member movable relative thereto and having an operating means overlying said supporting member, means holding said supporting member in predetermined spaced relation to said operating means, a resilient member movable by said operating means and fixed to said supporting member and extending between said supporting member and said operating means in spaced relation to said supporting member, a contact member, and a second contact member carried by said resilient member and cooperable with said first contact member upon movement of said resilient member by said operating means.

10. A device of the character described, comprising a base member having a supporting member adjustably mounted thereon, a magnet and a contact member carried by said supporting member, a resilient member fixed to said supporting member and having a contact member cooperable with said first contact member, means to flex said resilient member into the field of said magnet whereby said magnet will cause engagement of said contact members, and means to adjust said supporting member relative to said last-named means to determine the operation of said resilient member by said last-named means.

11. A device of the character described, comprising a base member, a supporting member adjustably mounted on said base member and having a contact member, a movable member having a contact member cooperable with said first-named contact member, means securing said movable member to said supporting member, a magnet cooperable with said movable member and operable to resist separation of said contact members, means to move said movable member relative to said magnet, and means to adjust said supporting member whereby to regulate the operation of said movable member by said last-named means.

12. A device of the character described, comprising a base member, a supporting member adjustably mounted on said base member and having a contact member, a movable member having a contact member cooperable with said first-named contact member, means securing said movable member to said supporting member, a magnet carried by said supporting member, said magnet being cooperable with said movable member and operable to resist separation of said contact members, means to move said movable member relative to said magnet, and means to adjust said supporting member whereby to regulate the operation of said movable member by said last-named means.

13. A device of the character described, comprising a base member, a supporting member adjustably mounted on said base member and having a contact member, a movable member having a contact member cooperable with said first-named contact member, means securing said movable member to said supporting member, a magnet cooperable with said movable member and operable to resist separation of said contact members, one of said contact members being adjustable whereby to regulate the magnetic attraction of said magnet acting on said movable member, means to move said movable member relative to said magnet, and means to adjust said supporting member whereby to regulate the operation of said movable member by said last-named means.

14. A device of the character described, comprising a base member, a supporting member adjustably mounted on said base member and having a contact member, a movable member having a contact member cooperable with said first-named contact member, means securing said movable member to said supporting member, a magnet cooperable with said movable member and operable to resist separation of said contact members, temperature responsive means to move said movable member relative to said magnet, and means to adjust said supporting member whereby to regulate the operation of said movable member by said last-named means.

15. A device of the character described, comprising a base member, a supporting member adjustably mounted on said base member and having a contact member, a movable member having a contact member cooperable with said first-named contact member, means securing said movable member to said supporting member, a magnet cooperable with said movable member and operable to resist separation of said contact members, temperature responsive means engaging said movable member and being operable to move said movable member relative to said magnet, and means to adjust said supporting member whereby to regulate the operation of said movable member by said last-named means.

16. A device of the character described, comprising a movable supporting member, a switch member carried by said member and movable toward and from said member, operating means for moving said switch member relative to said supporting member, a contact member cooperable with said switch member upon movement of said switch member relative to said supporting member, and means to adjust said supporting member to regulate the operation of said switch member by said operating means.

17. A device of the character described, comprising a base member, a movable supporting member carried by said base member, a movable switch member carried by said supporting member, a contact member cooperable with said switch member, operating means mounted on said base member and cooperable with said switch member to move said switch member relative to said supporting member and to said contact member, and means to adjust said supporting member relative to said operating means to regulate the operation of said switch member by said operating means.

18. A device of the character described, comprising a movable supporting member, a switch member carried by said member and movable toward and from said member, a contact member cooperable with said switch member, operating means for moving said switch member relative to said supporting member and to said contact member, means to adjust said supporting member to regulate the operation of said switch member by said operating means, and means to regulate the differential operation of said switch member.

19. A device of the character described, comprising a base member, a supporting member having one end portion movably connected to said base member, a magnet carried by said end portion, a flexible blade fixed to said supporting member and having a portion movable relative thereto, said blade portion extending into opposed spaced relation to a pole of said magnet, a power means acting on said blade and operable to move said blade relative to said magnet whereby to vary the magnetic influence of said magnet upon said blade, means opposing operation of said blade by said magnet, a contact member carried by said blade, and a contact member cooperable with said first-named contact member on movement of said blade.

20. A device of the character described, comprising a base member, a supporting member, a hinge member secured to said supporting member and connecting said supporting member to said base member for movement relative thereto, a magnet carried by said supporting member, a flexible blade fixed to said supporting member and having a portion movable relative thereto, said blade portion extending into opposed spaced relation to a pole of said magnet, a power means acting on said blade and operable to move said blade relative to said magnet whereby to vary the magnetic influence of said magnet upon said blade, means opposing operation of said blade by said magnet, means operable to move said supporting member relative to said base member and to said power means whereby to regulate the operation of said blade by said power means, a contact member carried by said blade, and a contact member cooperable with said first-named contact member on movement of said blade.

21. A device of the character described, comprising a base member, a contact member, a flexible blade having a limit of movement and having a contact member cooperable with said first-named contact member, supporting means rigid with said base member and positioned at the sides of said blade, a casing mounted on said supporting means and having a movable wall facing said blade, a plunger operable by said wall and operatively engaging said blade whereby to move said second-named contact member relative to said first-named contact member, means opposing movement of said wall, and lost-motion means for said plunger whereby said plunger is free to continue movement after said blade has reached its limit of movement.

22. A device of the character described, comprising a base member, a contact member, a movable arm having a contact member cooperable with said first-named contact member, supporting means rigid with said base member and positioned beside said arm, an hermetically sealed casing rigidly mounted on said supporting means, said casing containing an expansible fluid and having a movable wall facing said arm, a plunger operable by said wall and operatively engaging said arm whereby to move said second-named contact member relative to said first-named contact member, and means opposing movement of said wall.

23. A device of the character described, comprising a base member, a contact member, a movable arm having a contact member cooperable with said first-named contact member, supporting means rigid with said base member and positioned beside said arm, a plate member carried by said supporting means, a casing mounted on said plate member and rigidly fixed thereto and having a movable wall facing said arm, a plunger operable by said wall and operatively engaging said arm whereby to move said second-named contact member relative to said first-named contact member, spring means opposing movement of said wall, and means to regulate the operation of said arm by said plunger.

24. A device of the character described, comprising a base member, a contact member, a movably supported contact carrying arm having a contact member cooperable with said first-named contact member, supporting means positioned at the sides of said arm, a plate member extending between and fixed to said supporting means and having an aperture therethrough, a casing member carried by and fixed to said plate member, said casing member having a resilient metal bellows sealed at one end to the side walls of said casing member and having its other end extending into said casing member, said other bellows end having an end wall, a plunger carried by said end wall and projecting through said aperture, said plunger having operative engagement with said arm to move the same, and a helical coil spring surrounding said plunger and held under compression against said end wall whereby to resist movement of said end wall.

25. A device of the character described, comprising a supporting member, a magnet carried by said supporting member, a movable contact carrying arm having an armature adjacent one end cooperable with said magnet, said arm having a flexible hinge portion adjacent its other end, means rigidly securing said hinge portion to said supporting member, a contact member carried by said supporting member intermediate the ends of said arm, a contact member carried by said arm and cooperable with said first-named contact member, means acting on said arm to move said arm and armature relative to said magnet and to move said contact members toward each other, the inherent resilience of said hinge portion normally opposing movement of said arm by said last-named means, and means to regulate the operation of said last-named means.

26. A device of the character described, comprising a supporting member, a magnet carried by said supporting member, a movable contact carrying arm having an armature adjacent one end cooperable with said magnet, said arm having a flexible hinge portion adjacent its other end, means rigidly securing said hinge portion to said supporting member, a contact member carried by said supporting member intermediate the ends of said arm, a contact member carried by said arm and cooperable with said first-named contact member, means acting on said arm to move said arm and armature relative to said magnet and to move said contact members toward each other, the inherent resilience of said hinge portion normally opposing movement of said arm by said last-named means, means to regulate the operation of said last-named means, and means acting with the inherent resilience of said hinge portion to oppose operation of said arm by said first-named means.

27. A device of the character described, comprising a base member, a substantially U-shaped permanent magnet, means securing said magnet in position with the poles of said magnet extending at substantially right angles to said base member, a contact carrying arm having one end portion defining an armature cooperable with the poles of said magnet, the other end of said arm having a resilient flexible hinge portion, a contact member carried by said arm intermediate said portions, a contact member rigid with said magnet and cooperable with said first-named contact member, means cooperable with said arm to move said arm relative to said magnet, and means opposing operation of said last-named means, said contact members cooperating to prevent engagement of said armature and the poles of said magnet.

28. A device of the character described, comprising a base member, supporting means rigid with said base member, an hermetically sealed casing containing an expansible fluid and rigidly mounted on said supporting means, said casing having a movable wall facing said base member, control mechanism supported by said base member and including a control means, a movable arm for actuating said control means, and means operatively connecting said wall and said arm, a cover member enclosing said control mechanism having an aperture therethrough through which said casing projects whereby to subject said casing to temperature of the medium surrounding said cover member, and means securing said cover member to said base member.

29. A device of the character described, comprising a base member, supporting means rigid with said base member, an hermetically sealed casing containing an expansible fluid and having a marginal surrounding flange, means securing said flange to said supporting means, said casing having a movable wall facing said base member, control mechanism supported by said base member and including a control means, a movable arm for actuating said control means, and means operatively connecting said wall and said arm, a cover member enclosing said control mechanism having an aperture therethrough through which said casing projects whereby to subject said casing to temperature of the medium surrounding said cover member, said flange and said casing cooperating to close said aperture, and means securing said cover member to said base member.

30. A device of the character described, comprising a base member, a contact member, a movable arm having a contact member cooperable with said first-named contact member, supporting posts rigidly secured to said base member and extending therefrom, certain of said posts being positioned laterally of said arm, a plate member carried by and joining said certain posts, resilient means carried by said posts and movable in response to temperature change, a thrust member operable by said resilient means and operatively engaging said arm whereby to move said second-named contact member relative to said first-named contact member, and means to regulate the operation of said arm by said resilient means.

31. A device of the character described, comprising a base member, a contact member, a movable arm having a contact member cooperable with said first-named contact member, supporting posts rigidly secured to said base member and extending therefrom, certain of said posts being positioned laterally of said arm, a plate member carried by and joining said certain posts, temperature responsive means carried by said posts, a thrust member operable by said responsive means and operatively engaging said arm whereby to move said second-named contact member relative to said first-named contact member, and an adjustment screw cooperable with said plate member and operable to regulate the response of said responsive means.

32. A device of the character described, comprising a base member, a supporting member mounted on said base member in overlying spaced relation thereto and having a portion movable toward and from said base member, a contact member carried by said supporting member, temperature responsive operating means fixed to and spaced from said base member, a resilient switch blade positioned between said operating means and said base member and having a contact member cooperable with said first-named contact member, and a thrust member interposed between said responsive means and said blade whereby said blade is operable by said responsive means, said supporting portion moving after engagement of said contact members to permit overtravel of said thrust member.

LEWIS W. EGGLESTON.
EARNEST J. DILLMAN.